(12) United States Patent
Chi

(10) Patent No.: US 8,607,095 B2
(45) Date of Patent: Dec. 10, 2013

(54) SERVER TESTING SYSTEM

(75) Inventor: Mu-Cheng Chi, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 379 days.

(21) Appl. No.: 13/187,516

(22) Filed: Jul. 21, 2011

(65) Prior Publication Data
US 2012/0272101 A1    Oct. 25, 2012

(30) Foreign Application Priority Data

Apr. 19, 2011   (TW) .............................. 100113470 A

(51) Int. Cl.
*G06F 11/00* (2006.01)
(52) U.S. Cl.
USPC .............................................. 714/25; 714/36
(58) Field of Classification Search
None
See application file for complete search history.

(56) References Cited

U.S. PATENT DOCUMENTS

| | | | | |
|---|---|---|---|---|
| 6,163,849 A | * | 12/2000 | Nouri et al. | 713/324 |
| 8,166,346 B2 | * | 4/2012 | Wang | 714/36 |
| 2011/0138233 A1 | * | 6/2011 | Wang | 714/46 |
| 2012/0226464 A1 | * | 9/2012 | Lin | 702/119 |
| 2012/0304011 A1 | * | 11/2012 | Lai | 714/36 |

* cited by examiner

*Primary Examiner* — Christopher McCarthy
(74) *Attorney, Agent, or Firm* — Altis Law Group, Inc.

(57) ABSTRACT

A server testing system is used for testing servers of a server system and includes a power source, switches, a connection device, a controlling device, and a display device. Each switch is connected to the power source and the controlling device. The controlling device is connected to the connection device and the display device. The controlling device controls each switch to connect a corresponding server to the power source. When receiving a feedback signal from a server, the connection device sends a status signal to the controlling device. The status signal triggers the controlling device to control a corresponding switch to disconnect and then connect the server to the power source. The controlling module controls the switches to turn each server on and off for a predetermined number of times and controls the display device to display a warning when a server is not working normally.

9 Claims, 6 Drawing Sheets

First table

| Receiving port No. | Status signals |
|---|---|
| Receiving port 1 | Status signal 1 |
| Receiving port 2 | Status signal 2 |
| Receiving port 3 | Status signal 3 |
| ⋮ | ⋮ |

Second table

| States signals | Controlling port No. |
|---|---|
| Status signal 1 | Controlling port 1 |
| Status signal 2 | Controlling port 2 |
| Status signal 3 | Controlling port 3 |
| ⋮ | ⋮ |

Third table

| Controlling port No. | Stop signals |
|---|---|
| Controlling port 1 | Stop signal 1 |
| Controlling port 2 | Stop signal 2 |
| Controlling port 3 | Stop signal 3 |
| ⋮ | ⋮ |

Fourth table

| Controlling port No. | Fault signals |
|---|---|
| Controlling port 1 | Fault signal 1 |
| Controlling port 2 | Fault signal 2 |
| Controlling port 3 | Fault signal 3 |
| ⋮ | ⋮ |

Fifth table

| Fault signals | Receiving port No. |
|---|---|
| Fault signal 1 | Receiving port 1 |
| Fault signal 2 | Receiving port 2 |
| Fault signal 3 | Receiving port 3 |
| ⋮ | ⋮ |

SERVER TESTING SYSTEM

BACKGROUND

1. Technical Field

The present disclosure relates to testing systems and, particularly, to a server testing system.

2. Description of Related Art

Blade server systems usually include a number of servers. Each server needs to pass a switching test. In the switching test, the server is repeatedly turned on and turned off (usually hundreds of times) to ensure the server system can work properly. However, the switching test is carried out manually at present, which is an inefficient use of labor.

Therefore, it is desirable to provide a server testing system which can overcome the above-mentioned limitations.

BRIEF DESCRIPTION OF THE DRAWINGS

Many aspects of the present disclosure can be better understood with reference to the drawings. The components in the drawing are not necessarily drawn to scale, the emphasis instead being placed upon clearly illustrating the principles of the present disclosure.

FIG. 2 is a first table built in the connection device of FIG. 1.

FIG. 3 is a second table built in the controlling module of FIG. 1.

FIG. 4 is a third table built in the controlling module and the timing module of FIG. 1.

FIG. 5 is a fourth table built in the timing module of FIG. 1.

FIG. 6 is a fifth table built in the display device of FIG. 1.

DETAILED DESCRIPTION

Figure 1:
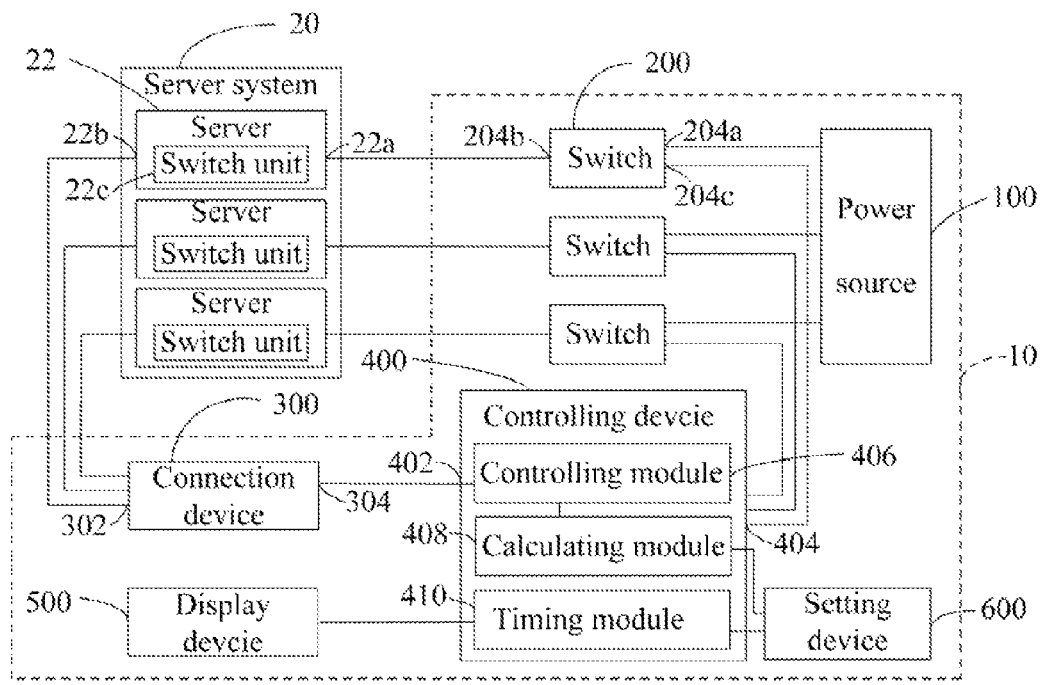
FIG. 1 is a functional block diagram of a server testing system, which includes a connection device, a controlling module, a timing module, and a display device, in accordance with an exemplary embodiment.

Embodiments of the present disclosure will now be described in detail with reference to the figures.

Referring to FIG. 1, a server testing system 10, according to an exemplary embodiment, is used to perform a switching test on a number of servers 22 of a server system 20. The server testing system 10 includes a power source 100, a number of switches 200, a connection device 300, a controlling device 400, a display device 500, and a setting device 600.

Each of the servers 22 includes a power port 22a, a feedback port 22b, and a switch unit 22c. Each switch unit 22c turns on a corresponding server 22 when the power port 22a of the server 22 is connected to the power source 100 and then turns off the server 22 once the server 22 has been turned on. Each server 22 outputs a feedback signal through the feedback port 22b once the server 22 has been turned off. In the present disclosure, the server system 20 includes three servers 22.

Each of the switches 200 includes a first port 204a, a second port 204b, and a first control port 204c. Each first port 204a is connected to the power source 100. Each second port 204b is configured to connect to a corresponding power port 22a. Each switch 200 connects the first port 204a to the second port 204b when the first control port 204c receives a connection signal. Each switch 200 disconnects the first port 204a from the second port 204b when the first control port 204c receives a disconnection signal. In the present disclosure, the server testing system 10 includes three switches 200, corresponding to the three servers 22.

The connection device 300 includes a built-in first table 300a shown in FIG. 2, a number of receiving ports 302, and a first transmitting port 304. The receiving ports 302 correspond to the feedback ports 22b. Each receiving port 302 is configured to connect to a corresponding feedback port 22b to receive the feedback signal. The first table 300a includes the individual numbers of the receiving ports 302 and all the status signals. Each of the status signals correspond to the individual numbers of the receiving ports 302. When a receiving port 302 receives a feedback signal, the connection device 300 looks up the first table 300a and generates a status signal corresponding to the particular receiving port 302 that received the feedback signal, and sends the status signal to the first transmitting port 304. In the present disclosure, the connection device 300 includes three receiving ports 302 respectively, corresponding to the three servers 22.

The control device 400 includes a second transmitting port 402, a number of second control ports 404, a controlling module 406, a calculating module 408, and a timing module 410. The second transmitting port 402 is connected to the first transmitting port 304. The second control ports 404 correspond to the receiving ports 302 and the first control ports 204c. Each of the second control ports 404 is connected to a corresponding first control port 204c. In the present disclosure, the control device 400 includes three second control ports 404, corresponding to the three receiving ports 302 and the three first control ports 204c.

The controlling module 406 includes a built-in second table 406a shown in FIG. 3 and a built-in third table 408a shown in FIG. 4. The second table 406a includes the individual status signals and the corresponding numbers of the second control ports 404. The third table 408a includes the individual numbers of the second control ports 404 and each of the corresponding stop signals. The controlling module 406 is connected to the second transmitting port 402, the calculating module 408, and the second control ports 404. The controlling module 406 is configured to generate a series of connection signals and send the appropriate connection signal to the second control ports 404 individually when the server testing system 10 is turned on. When the second transmitting port 402 receives a status signal, the controlling module 406 looks up the second table 406a to find the second control port 404 that corresponds to the status signal, generates a disconnection signal and a subsequent connection signal, and sends the disconnection signal and the subsequent connection signal to the second control port 404 which corresponds to the status signal received. When receiving a stop signal from the calculating module 408, the controlling module 406 looks up the third table 408a to find the second control port 404 that corresponds to the stop signal, generates a disconnection signal, and sends the disconnection signal to the second control port 404 which corresponds to the stop signal received.

The calculating module 408 includes the third table 408a and also includes a preset predetermined number. The calculating module 408 is connected to the second control ports 404, and is configured to calculate how many disconnection signals each second control ports 404 has sent. When the total number of the disconnection signals that a second control port 404 has sent reaches the predetermined number, the calculating module 408 looks up the third table to find a stop signal corresponding to the second control port 404 and sends that stop signal to the controlling module 406. As the controlling module 406 is controlling the servers 22, the total number of the disconnection signals that a second control port 404 has sent to the switch 200 represents number of times that the server 22 has been turned on and turned off.

The timing module 410 includes a fourth table 410a and also includes a preset predetermined time. The fourth table 410a includes the individual numbers of the second control ports 404 and fault signals. Each fault signal corresponds to a particular number of the second control port 404. The predetermined time exceeds the duration of the on-to-off cycle of the server 22. The timing module 410 is configured to monitor the disconnection signal and the connection signal sent by each second control port 404. When it is determined that the period of time from a connection signal to a disconnection signal by a particular second control port 404 is greater than the predetermined time, the timing module 410 looks up the forth table 410a to find a fault signal which corresponds to that second control port 404 and sends the fault signal to the display device 500.

The display device 600 includes a fifth table 500a. The fifth table 500a includes all the individual fault signals and the individual numbers of the receiving port 302. Each number of the receiving port 302 corresponds to a particular fault signal. When a fault signal has been received, the display device 600 looks up the fifth table 500a to find the receiving port 302 corresponding to that fault signal and displays the number of the receiving port 302.

The setting device 600 is connected to the calculating module 408 and the timing module 410 to allow presetting and resetting of the predetermined number and the predetermined time.

In operation, the predetermined number and the predetermined time are set through the setting device 600. Each power port 22a is connected to a corresponding second port 204b. Each feedback port 22b is connected to a corresponding receiving port 302. The receiving port 302 that the server 22b is connected to corresponds to the second control port 404 that the switch 200 (connected to the server 22b), is connected to.

As the server testing system 10 is turned on, the controlling module 406 sends the connection signals to the second control ports 404. The timing module 410 begins to record the passing of time. Receiving the connection signal, each switch 200 is turned on, connecting the first port 204a to the second port 204b. As such, each server 22 is connected to the power source 100. Under the control of a corresponding a corresponding switch unit 22c, each server 22 is turned on and then turned off, while a corresponding switch 200 is still turned on. Each server 22 sends the feedback signal to a corresponding receiving port 302 through the feedback port 22b when the server 22 has turned off. When receiving a feedback signal, the connection device 300 sends a status signal corresponding to the receiving port 302 that received the feedback signal to the first transmitting port 304. When receiving a status signal through the second transmitting port 402, the controlling module 406 sends a disconnection signal and a connection signal in sequence to a second control port 404 that corresponds to the status signal.

When the period of time between the disconnection signal and the earlier connection signal of a second control port 404 is less than the predetermined time, the timing module 408 determines that the server 22 corresponding to the second control port 404 is working properly. The calculating module 408 carries out a count for the second control port 404. As such, receiving the disconnection signal and the connection signal in sequence, the switch 200 reconnect the server 22 to the power source 100, allowing the server 22 to go into the next cycle.

When the duration of period of time between the disconnection signal and the earlier connection signal of a second control port 404 is greater than the predetermined time, the timing module 408 determines that the server 22 corresponding to the second control port 404 is not work normally and sends a fault signal corresponding to the second control port 404 to the display device 500. The display device 500 may display the number of the receiving port 302.

When it is determined that the total number of disconnection signals sent by a second control port 404 has reached the predetermined number, the calculating module 408 sends a stop signal corresponding to the second control port 404 to the controlling module 402. When receiving the stop signal, the controlling module 406 sends a disconnection signal that corresponds to the stop signal to the second control port 404, which ends the test of the server 22 corresponding to the second control port 404.

It will be understood that the above embodiment is shown and described by way of illustration only. The principles and the features of the present disclosure may be employed in various and numerous embodiments thereof without departing from the scope of the disclosure as claimed. The above-described embodiment illustrates the scope of the disclosure but does not restrict the scope of the disclosure.

What is claimed is:

1. A server testing system, configured to turn on and turn off a plurality of servers of a server system, each of the servers comprising a power port and a feedback port, each server turning on when the power port thereof is connected to a power source and then turning off once it has been turned on, each server sending a feedback signal to the feedback port thereof once it has been turned off; the server testing system comprising:

a power source;

a plurality of switches, each of the switches comprising a first port, a second port, and a first control port; each first port being connected to the power source, each second port being configured to connect to a corresponding power port; each switch connecting the first port and the second port when the first control port receives a connection signal and disconnecting the first port to the second port when the first control port receives a disconnection signal;

a connection device, the connection device comprising a plurality of receiving ports, each receiving port being configured to connect to a corresponding feedback port; wherein when one of the receiving ports receives a feedback signal from a corresponding feedback port, the connection device generates a status signal corresponding to the receiving port that receives the feedback signal;

a controlling device connected to the connection device, the controlling device comprising a plurality of second control ports that correspond to the receiving ports and the first control ports, each second control port being connected to a corresponding first control port; wherein the controlling module sends a plurality of the connection signals to the second control ports when the server testing system is turned on; when receiving the status signal from the connection device, the controlling device sends a disconnection signal and a subsequent connection signal to the second control port that corresponds to the status signal; wherein when determining that the duration of a disconnection signal and the earlier connection signal of a second control port exceeds a predetermined time, the controlling device generates a fault signal that corresponds to the second control port; wherein when determining that the total number of the disconnection signals of a second control port reaches a predetermined number, the controlling device generates a stop signal corresponding to the second control port and sends a disconnection signals to the second control port that corresponds to the stop signal; and a display device connected to the controlling device, the display device being configured to receive the fault signal and display a label of the receiving port corresponding to the fault signal.

2. The server testing system of claim 1, wherein the controlling device comprises a controlling module and a calculating module, the controlling module is connected to the connection device and the second control ports, the calculating module is connected to the controlling module and the second control ports; the calculating module presets the predetermined number, the calculating module is configured to calculate how many disconnection signals each second control port has sent, and configured to send a stop signal corresponding to a second control port when the number of the disconnection signal that the second control port has sent reaches the predetermined number; when receiving a stop signal from the calculating module, the controlling module sends a disconnection signals to the second control port that corresponds to the stop signal; when receiving a status signal from the connection device, the controlling module sends a disconnection signal and a subsequent connection signal to the second control port that corresponds to the status signal.

3. The server testing system of claim 2, wherein the connection device comprises a built-in first table, the first table comprises the individual numbers of the receiving ports and the status signals, each status signal corresponds to the number of a corresponding receiving port, when a receiving port receives a feedback signal, the connection device looks up the first table to generate a status signal corresponding to the receiving port that receives the feedback signal; the controlling module comprises a built-in second table, the second table comprises the status signals and the individual numbers of the second control ports, the number of each second control port corresponds to a corresponding status signal, when receiving a status signal, the controlling module looks up the second table to find the second control port that corresponds to the status signal.

4. The server testing system of claim 2, wherein the calculating module comprises a third table, the third table comprises the individual numbers of the second control ports and stop signals, each stop signal corresponds to the number of a corresponding second control port, when the numbers of the disconnection signals that a second control port has sent reaches the predetermined number, the calculating module looks up the third table to find a stop signal corresponding to the second control port and sends the stop signal to the controlling module; the controlling module also comprises the third table, when receiving a stop signal from the calculating module, the controlling module looks up the third table to find a second control port that corresponds to the stop signal.

5. The server testing system of claim 2 further comprising a setting device, wherein the setting device is connected to the calculating device to allow setting of the predetermined number.

6. The server testing system of claim 2, wherein the controlling device further comprises a timing module, the timing module presets the predetermined time, the timing module is configured to monitor the disconnection signals and the connection signals of each second control port, and configured to send the fault signal to the display device when determining that the duration of a connection signal and an earlier disconnection signal of a second control port is greater than the predetermined time.

7. The server testing system of claim 6, wherein the predetermined time is longer than the duration of the on-to-off cycle of each server.

8. The server testing system of claim 6, wherein the timing module comprises a fourth table, the fourth table comprises the individual numbers of the second control ports and fault signals, each fault signal corresponds to the number of a corresponding second control port; when determining that the duration of a connection signal and an earlier disconnection signal of a second control port is greater than the predetermined time, the timing module looks up the forth table to find a fault signal corresponding to the second control port; the display device comprises a fifth table, the fifth table comprises the fault signals and the individual numbers of the receiving ports, when receiving a fault signal, the display device looks up the fifth table to find a receiving port corresponding to the fault signal.

9. The server testing system of claim 6, further comprising a setting device, wherein the setting device is connected to the calculating module and the timing module to allow settings of the predetermined number and the predetermined time.

* * * * *